(12) United States Patent
Wang et al.

(10) Patent No.: US 12,140,709 B2
(45) Date of Patent: Nov. 12, 2024

(54) METHODS AND SYSTEMS FOR SPAD OPTIMIZATION

(71) Applicant: SHENZHEN ADAPS PHOTONICS TECHNOLOGY CO., LTD., Shenzhen (CN)

(72) Inventors: Letian Wang, Shenzhen (CN); Chao Zhang, Shenzhen (CN)

(73) Assignee: SHENZHEN ADAPS PHOTONICS TECHNOLOGY CO., LTD., Shenzhen (CN)

( * ) Notice: Subject to any disclaimer, the term of this patent is extended or adjusted under 35 U.S.C. 154(b) by 428 days.

(21) Appl. No.: 17/702,459

(22) Filed: Mar. 23, 2022

(65) Prior Publication Data
US 2022/0221562 A1 Jul. 14, 2022

(30) Foreign Application Priority Data
Mar. 23, 2021 (CN) .......................... 202110307092.8

(51) Int. Cl.
| | | |
|---|---|---|
| *G01S 7/4865* | (2020.01) | |
| *G01S 7/481* | (2006.01) | |
| *G01S 17/10* | (2020.01) | |
| *H04N 25/44* | (2023.01) | |
| *H04N 25/46* | (2023.01) | |
| *H04N 25/75* | (2023.01) | |

(52) U.S. Cl.
CPC .......... *G01S 7/4865* (2013.01); *G01S 7/4814* (2013.01); *G01S 7/4816* (2013.01); *G01S 17/10* (2013.01); *H04N 25/44* (2023.01); *H04N 25/46* (2023.01); *H04N 25/75* (2023.01)

(58) Field of Classification Search
CPC .... G01S 7/4865; G01S 7/4814; G01S 7/4816; G01S 17/10; G01S 7/487; G01S 17/08; G01S 7/4915; H04N 25/44; H04N 25/46; H04N 25/75; H04N 25/00
See application file for complete search history.

(56) References Cited

U.S. PATENT DOCUMENTS

| | | | |
|---|---|---|---|
| 10,656,251 B1 * | 5/2020 | Mandai | ................. G01J 1/0233 |
| 11,639,990 B2 * | 5/2023 | Henderson | ............ G01S 17/894 356/4.01 |
| 2013/0300838 A1 | 11/2013 | Borowski | |

FOREIGN PATENT DOCUMENTS

| | | |
|---|---|---|
| CN | 110596722 A | 12/2019 |
| CN | 110609293 A | 12/2019 |
| CN | 111562590 A | 12/2019 |
| CN | 111812661 A | 10/2020 |

(Continued)

OTHER PUBLICATIONS

The First Office Action dated Mar. 2, 2024 for Chinese Application No. 202110307092.8.

(Continued)

*Primary Examiner* — Seung C Sohn

(57) ABSTRACT

The present invention is directed to lidar systems and methods thereof. In a specific embodiment, the present invention provides a lidar system that includes a SPAD sensor includes n SPAD pixel rows. Based on the location of a target object on the SPAD sensor, m rows of n SPAD pixels row are selected based at least on the histograms generated using the n SPAD pixel rows. There are other embodiments as well.

20 Claims, 7 Drawing Sheets

(56) References Cited

FOREIGN PATENT DOCUMENTS

| | | | |
|---|---|---|---|
| CN | 112114324 | A | 12/2020 |
| DE | 202018002044 | U1 | 6/2018 |

OTHER PUBLICATIONS

Ruizhi Sun et al. "Single-Photon Detection Based on High Dynamic Range Time-to-digital Converter", Journal of Jilin University (Information Science Edition), vol. 36 No. 4, Jul. 2018, pp. 381-385.

* cited by examiner

METHODS AND SYSTEMS FOR SPAD OPTIMIZATION

CROSS-REFERENCES TO RELATED APPLICATIONS

The present invention claims priority to China Patent Application No. 202110307092.8, filed Mar. 23, 2021, which is commonly owned and incorporated by reference herein for all purposes.

BACKGROUND OF THE INVENTION

The present invention relates generally to lidar sensing devices.

Research and development in integrated microelectronics have continued to produce astounding progress with sensor devices. Many examples of photodiodes exist. For example, a photodiode is a p-n junction or PIN structure. When a photon of sufficient energy strikes the diode, it creates an electron-hole pair. This mechanism is also known as the inner photoelectric effect. If the absorption occurs in the junction's depletion region, or one diffusion length away from it, these carriers are swept from the junction by the built-in electric field of the depletion region. Thus, as holes move toward the anode (electrons move toward the cathode), a photocurrent is produced. The total current through the photodiode is the sum of the dark current (current that is generated in the absence of light) and the photocurrent, so the dark current must be minimized to maximize the sensitivity of the device.

Another example of a photodiode is called an "avalanche photodiode". The avalanche photodiodes are photodiodes with a structure optimized for operating with high reverse bias, approaching the reverse breakdown voltage. This allows each photo-generated carrier to be multiplied by avalanche breakdown, resulting in internal gain within the photodiode, which increases the effective sensitivity of the device. A type of photodiode—usually referred to as a single-photon avalanche diode (SPAD) device—has been gaining popularity and used in a variety of applications, such as lidar systems that have become a mainstream component of consumer electronics, automobiles, and other applications. A SPAD sensor circuit includes multiple SPAD pixels, which are typically arranged as a two-dimensional array. A SPAD sensor circuit may be an important component of a lidar system.

A lidar system includes many components in addition to SPAD circuits. SPAD circuits convert received light signals to electrical currents, and the converted electrical currents are converted to digital signals—along with their associated timing information—by time-to-digital converters (TDCs). In various conventional implementations, SPAD circuits and the corresponding TDCs are often inefficiently implemented, wasting energy and computational resources.

From the above, it is seen that techniques for improving sensing devices are highly desired.

BRIEF SUMMARY OF THE INVENTION

The present invention is directed to lidar systems and methods thereof. In a specific embodiment, the present invention provides a lidar system that includes a SPAD sensor includes n SPAD pixel rows. Based on the location of a target object on the SPAD sensor, m rows of n SPAD pixels row are selected based at least on the histograms generated using the n SPAD pixel rows. There are other embodiments as well.

One general aspect includes a method for range determination using selected sensor circuits. The method includes transmitting, by a transmitting end, a pulsed laser. The method also includes receiving a first optical signal reflected by a target object at a first time and converting the received first optical signal into a first analog electrical signal by a receiving end, where the receiving end may include a plurality of pixel units, the plurality of pixel units including n pixel rows. The method also includes converting the first analog electrical signal outputted by the n pixel rows into digital signals and outputting n histogram signals by using n time-to-digital converters (TDCs). The method also includes generating a first plurality of histograms using the n histogram signals. The method also includes processing the first plurality of histograms to identify m pixel rows associated with the target objects. The method also includes receiving a second optical signal reflected by the target object at a second time and converting the received second optical signal into a second analog electrical signal by the m pixel rows. The method also includes converting the second analog electrical signal outputted by the m pixel rows into digital signals and outputting m histogram signals by using m TDCs. The method also includes generating a at least a second histogram using the m histogram signals. The method also includes determining a first distance of the target object using at least the second histogram. Other embodiments of this aspect include corresponding computer systems, apparatus, and computer programs recorded on one or more computer storage devices, each configured to perform the actions of the methods.

Implementations may include one or more of the following features. The method may include identifying a new set of m pixel rows in response to a location change of the target object. The first analog electrical signal is converted by coarse TDCs and the second analog electrical signal is converted by fine TDCs. The first plurality of the histograms is characterized by a lower resolution than the second histogram. Each of n pixel rows includes l pixel units, each of the n TDCs being configured to accumulate a photon count of the l pixel units. The method may include: identifying a plurality of histogram peaks from the n histogram signals; selecting one or more peaks associated with the target object, the m pixel rows being including pixel units associated with a position of the target object. The method may include removing one or more peaks associated with flare or noise. The method may include: identifying one or more time bins associated with one or more peaks, performing fine calculations using the one or more time bins. The method may include turning off n-m pixel rows not associated with a target object. The method may include determining a second distance of the target object using the first plurality of histograms. The first distance is characterized by a higher level of precision than the second distance. Implementations of the described techniques may include hardware, a method or process, or computer software on a computer-accessible medium.

One general aspect includes a lidar system that includes a laser source configured to generate a laser signal at a first time within a time interval. The system also includes an optical module configured for receiving a reflected laser signal at a second time. The system also includes a SPAD sensor may include n SPAD pixel rows, each of the n SPAD pixel rows may include l SPAD pixel units. The system also includes a first time-to-digital converter (TDC) module may include n TDC units coupled to the n SPAD pixel rows, the n TDC units being configured to generate n histogram signals, each of the histogram signals being calculated using 1 SPAD pixel units. The system also includes a histogram module configured to generate n histograms using the n histogram signals. The system also includes a memory configured to store the n histograms. The system also includes a control module configured to select a first plurality of m SPAD pixel rows based at least on the n histograms. The system also includes a processor module configured to calculate a time of flight (TOF) value using at least the n histograms. Other embodiments of this aspect include corresponding computer systems, apparatus, and computer programs recorded on one or more computer storage devices, each configured to perform the actions of the methods.

Implementations may include one or more of the following features. The laser source and the optical module are associated with a parallax orientation, an orientation of n SPAD pixel rows being selected based at least on the parallax orientation. The system may include a second TDC module, the first TDC module being a coarse TDC module characterized by a first sensitivity of less than 0.5 ns, the second TDC module being a fine TDC module characterized by a second sensitivity of great than 0.1 ns. The system may include a third TDC module may include n*1 TDC units. The control module is configured to select a second plurality of m SPAD pixel rows in response to the change of a target object location. The control module is configured to turn off a second plurality of n-m SPAD pixel rows. Implementations of the described techniques may include hardware, a method or process, or computer software on a computer-accessible medium.

It is to be appreciated that embodiments of the present invention provide many advantages over conventional techniques. Among other things, by selectively activating and deactivating SPAD pixel rows or columns in a lidar system, system performance (e.g., signal to noise ratio of SPAD output) is improved, while power consumption and computational complexity can be reduced.

Embodiments of the present invention can be implemented in conjunction with existing systems and processes. For example, the walk error correction techniques according to the embodiments of the present invention can be used in a wide range of existing lidar systems and devices.

The present invention achieves these benefits and others in the context of known technology. However, a further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

DETAILED DESCRIPTION OF THE INVENTION

Figure 1:
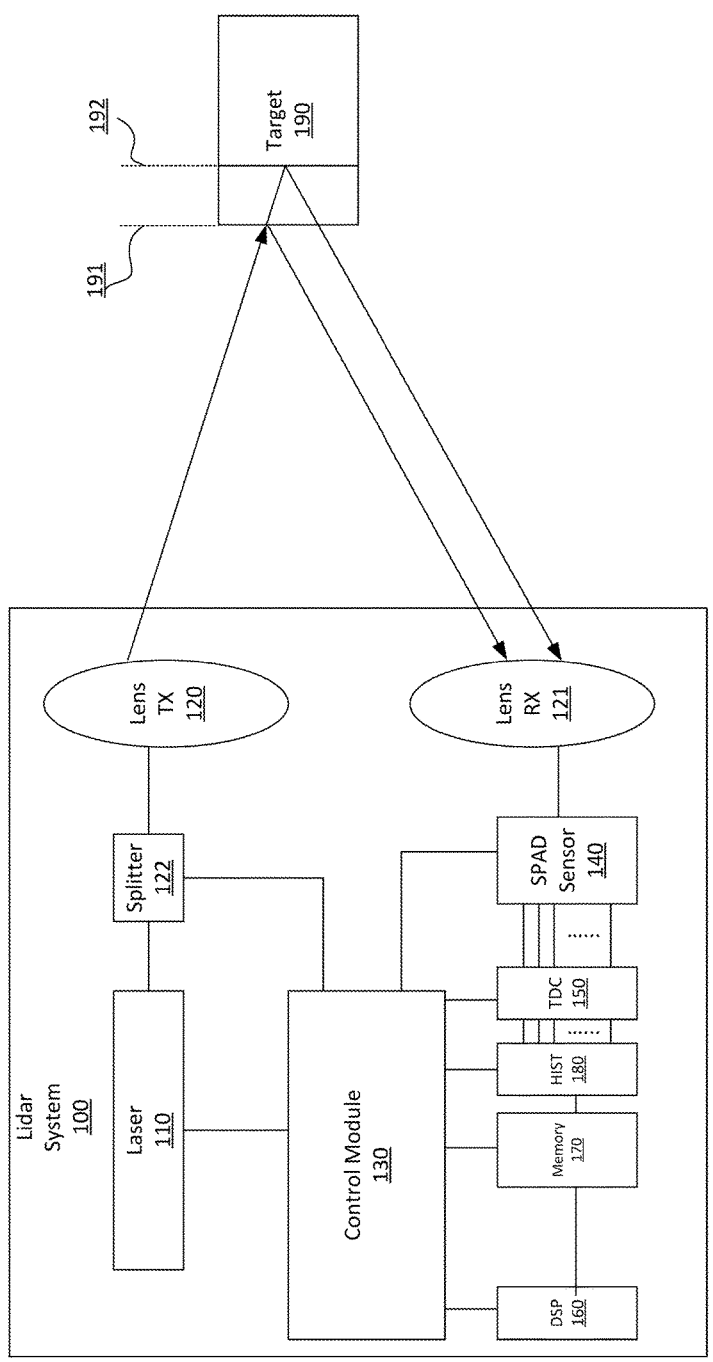
FIG. 1 is a simplified block diagram of a lidar according to embodiments of the present invention.

The present invention is directed to lidar systems and methods thereof. In a specific embodiment, the present invention provides a lidar system that includes a SPAD sensor includes n SPAD pixel rows. Based on the location of a target object on the SPAD sensor, m rows of n SPAD pixels row are selected based at least on the histograms generated using the n SPAD pixel rows. There are other embodiments as well.

As explained above, in a lidar system, a SPAD sensor and its corresponding TDC module often operate inefficiently. Often, only a small subset of the SPAD pixels and their corresponding TDCs are needed to calculate the distance of a target object, but the entire SPAD sensor is active. Some conventional solutions have been proposed to select SPAD pixels based on the location of the target object, but these conventional solutions are often cumbersome and complex, where the amount of calculation needed for SPAD pixel selection is itself too expensive and unreliable. It is to be appreciated that according to embodiments of the present invention, active SPAD pixels are grouped and selected as pixel rows (or pixel columns) based on the target object location. In various implementations, row-based (or column-based) SPAD pixel selection process is both fast and efficient. A row of selected SPAD pixels can offer enough tolerance to accommodate parallax shift, small target object movement, device variation, and at the same time selecting a row of SPAD pixels is much faster than selecting an arbitration group of pixels, which involves more calculations for pixel selection and more complex control schemes to selectively turn on the selected pixels.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

FIG. 1 is a simplified block diagram of a lidar according to embodiments of the present invention. This diagram is merely an example, which should not unduly limit the scope of the claims. One of ordinary skill in the art would recognize many variations, alternatives, and modifications. Lidar system 100 measures distance by calculating the time differences between transmitted light signals and the corresponding received signals. Laser 110, as controlled by the control module 130, emits laser pulses at predefined intervals. As an example, laser 110 may include stacked laser diodes that emit diffracted laser beams. Depending on the application, the output of laser 110 may be pulsed infrared laser signals. The laser pulse profile (e.g., width, shape, intensity, etc.) and the predefined intervals depend largely on the lidar system implementation and specifications, such as power, distance, resolution, and others. It is to be noted that since both the laser pulse shape (which can be described as a signal waveform) and pulse width are known characteristics to the lidar system 100, characteristics such as pulse shape and width are used in optimizing memory sharing. Lidar system 100 is configured to reconstruct images, with distance information, using a SPAD array that includes many SPAD pixels. For this application, the output of the laser 110 is manipulated to create a predefined pattern. It is understood that lens 120 refers to an optical module that may include multiple optical and/or mechanical elements. In certain implementations, lens 120 includes diffractive optical elements to create a desired output optical pattern. Lens 120 may include focusing and optical correction elements.

Control module 130 manages operations and various aspects of lidar system 100. In various implementations, control module 130 is capable of selectively activating and deactivating SPAD pixel circuits and TDC units. For example, control module 130 may be configured to activate and deactivate SPAD pixel circuits individually, by row, or by column. As shown, control module 130 is coupled to laser 110 and splitter 122, along with other components. Depending on the embodiment, control module 130 can be implemented using one or more microprocessors. Components such as TDC 150, histogram module 150, and digital signal processor (DSP) 160 as shown are functional blocks that are—on the chip layer—implemented with the same processor(s) for the control module 130. In addition to providing control signal signals to laser 110, control module 130 also receives the output of the laser 110 via splitter 122. Based on the output of splitter 122, control module 130 activates SPAD sensor 140, TDC 150, and other components to process received signals. Additionally, the output of splitter 122 provides the timing of the outgoing light signal, and this timing information is later used in dToF calculations.

A TDC unit can record the time of flight (TOF) of each received optical signal, i.e. the time interval between a transmitted pulse and its corresponding received pulse. For example, a dTOF module transmits and receives N optical signals within a predefined time window, and then makes histogram statistics on recorded n TOFs, where a TOF t corresponding to a position of the highest signal intensity or where the SPAD is triggered the most times is used to calculate a depth of a to-be-measured object.

Direct time of flight (dTOF) is one of the mainstream 3D imaging methods in recent years, in which the main components used include a SPAD array. As explained above, a SPAD is a detector with a high gain, a high sensitivity, and other advantages. A single SPAD connected to a TDC (or sometimes ADC) can directly generate a digital signal. For example, "0" is outputted in a case of "no signal", and "1" is outputted in a case of "signal". In various depth determination applications, a lidar uses two representative forms of a silicon photomultiplier (SiPM) and a SPAD array to implement ranging. For example, SPAD output ports in the SiPM can be connected in parallel as a whole output signal. With a number of SPAD pixels, the identification of signal light intensity can be realized. Respective pixels in the SPAD array individual output their signals, which allow for reconstruction of an image based on the light signal reflected off the target object. In various embodiments, SPAD pixels may be grouped by row or column, and the output of the entire row or columns of SPAD pixels may be processed as histograms.

The transmitted laser signal, upon reaching a target, is reflected. Since the laser signal is transmitted and received at different locations (i.e., locations of lens 120 and lens 121), the same target object 190 at different distances 191 and 192 would result in the laser signal reflected to different locations of lens 121, and subsequently different locations of SPAD sensor 140. For example, the shift of target object location on a SPAD sensor may be referred to as a parallax shift.

Figure 2:
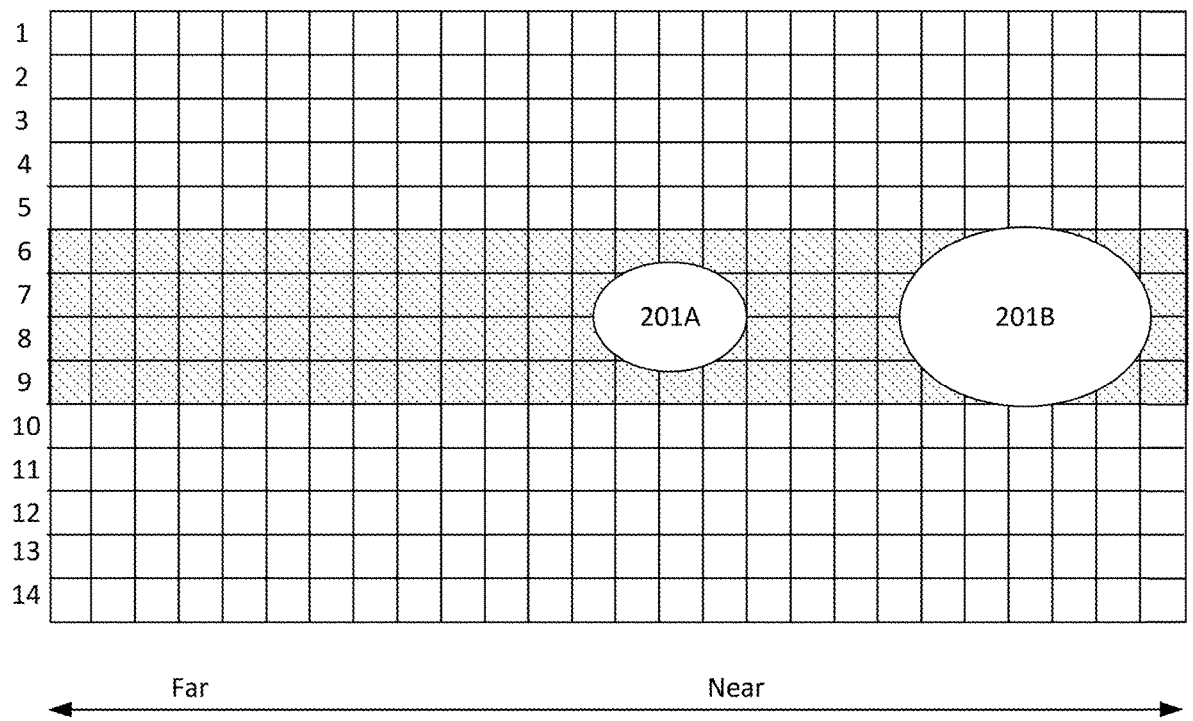
FIG. 2 is a simplified diagram illustrating parallax-induced location shifting.

FIG. 2 is a simplified diagram illustrating parallax-induced location shifting. For example, an image of a target object formed on a SPAD sensor moves from location 201A to 201B as the target object moves closer to the sensor. It is also to be noted that as the target object moves closer, the image size on the SPAD sensor also becomes larger (the amount of size change depending on the distance). In various implementations, as described in further details below, the selection of SPAD pixel rows (or columns) for initial histogram processing and selective activation is in part based on the orientation of the parallax shift. In a specific embodiment, horizontal rows of SPAD pixels are used because the transmitting lens and the receiving lens are horizontally aligned. In certain embodiments, sufficiently large rows (e.g., rows 6-9 in FIG. 2 or larger) or columns of SPAD pixels are selected to accommodate the shift of the target object's image on the SPAD sensor. Depending on the implementation, the SPAD pixel row selection and grouping may also account for device vibration, temperature change, and other factors.

Now referring back to FIG. 1. The reflected laser signal is received by lens 121, which focuses the received laser signal onto SPAD sensor 140. Lens 121 may include multiple optical and mechanical elements. SPAD sensor 140 converts the received laser signal to arrival signal pulses. In various embodiments, SPAD sensor 140 is implemented as a macro pixel that is commonly referred to as a digital silicon photomultiplier (dSiPM). In various embodiments, SPAD sensor 140 includes m (row) by l (column) SPAD pixel units, and the readout of the SPAD pixel units may be by row and/or column. TDC 150 includes a number (e.g., equal to the number of SPAD pixels) of TDCs that are configured to process the arrival time of multiple pulses generated by SPAD sensor 140. In various implementations, TDC 150 may include TDC units are each coupled to a row or column of SPAD pixel units. For example, a single TDC unit may be coupled to a row of SPAD pixel units, and the readout of a SPAD pixel row is accumulated by this TDC unit.

Figure 3:
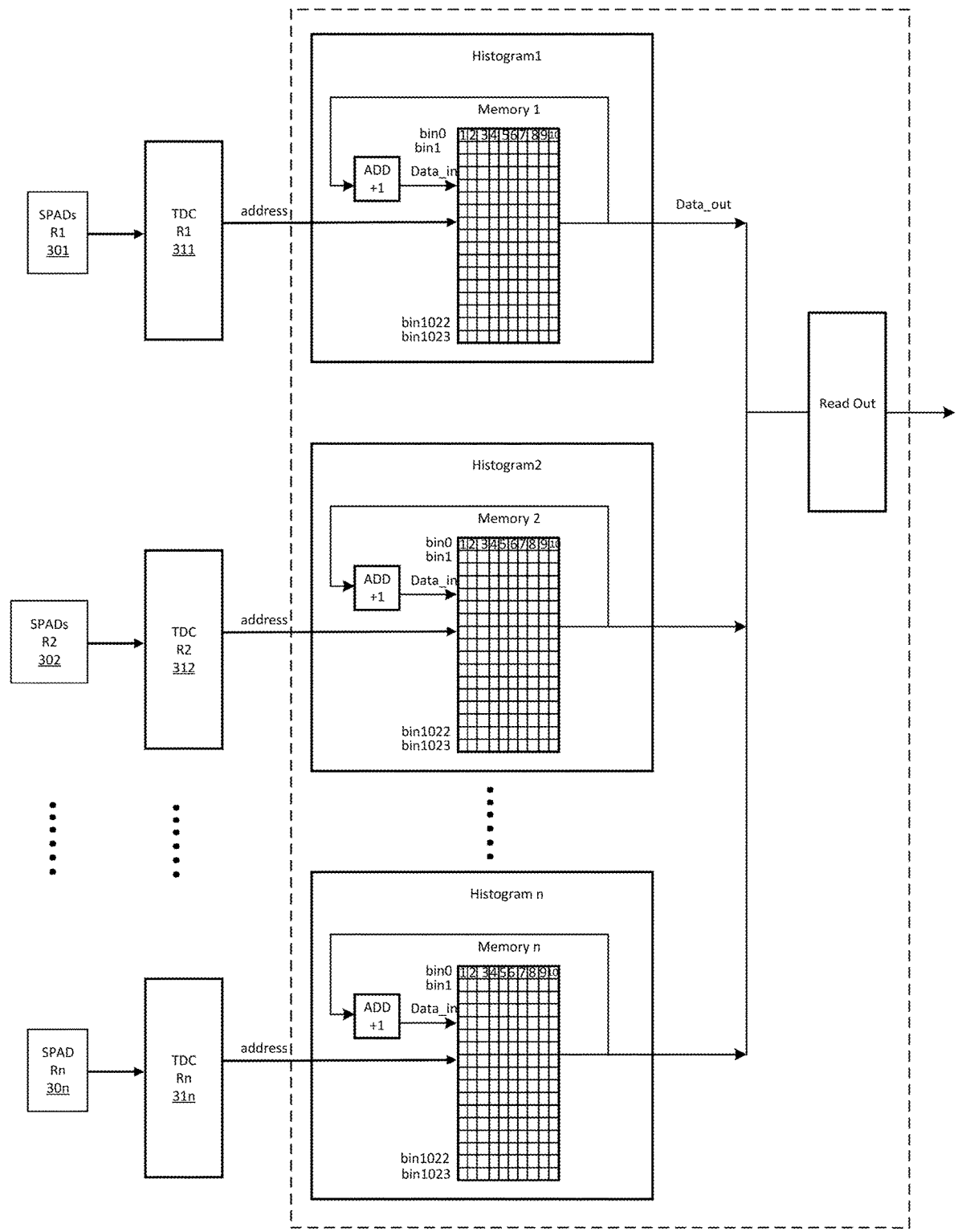
FIG. 3 is a simplified diagram illustrating TDCs and histogram modules configured for SPAD pixels rows according to embodiments of the present invention.

FIG. 3 is a simplified diagram illustrating TDCs and histogram modules configured for SPAD pixels rows according to embodiments of the present invention. This diagram is merely an example, which should not unduly limit the scope of the claims. One of ordinary skill in the art would recognize many variations, alternatives, and modifications. A row of SPAD sensor 301, which includes l number of SPAD pixel units, is coupled to TDC 311 as shown, which accumulates the inputs of all the pixels of SPAD row 301. Similarly, n TDC units (up to TDC 31n as shown) are configured corresponding to n SPAD pixel rows. The depths and bit widths of memory for SPAD pixel row are defined according to operating parameters of the lidar system 100. These operating parameters include lidar range, resolution, SNR of a dTOF system, and other factors. In various embodiments, within a single-frame interval as predefined for the lidar system, memory allocated to each SPAD is used for recording the number of times the SPAD generates pulses in the corresponding time bin. To store histograms for n rows of SPAD pixels, n memory blocks are allocated. For example, each individual memory block may include 2' time bins, and each unit of memory address corresponds to the time bins. For the purpose of illustration, SPAD pixel units and TDCs are grouped by rows, but they can be grouped by columns in various implementations. In certain embodiments, each SPAD pixel unit may be configured with its corresponding TDC and memory block, and the aggregate histogram of a SPAD pixel row is obtained by adding the total output of the TDCs and/or memory blocks corresponding to this SPAD pixel row.

Now referring back to FIG. 1. TDC 150 may include coarse and fine TDC units. For example, a fine TDC unit may have a sensitivity, as measured in the unit of time, of greater than 100 ps (e.g., greater sensitivity translates to shorter time here), while a coarse TDC unit may be a sensitivity of less than 0.5 ns or 1 ns. In various implementations, coarse TDCs are used in an initial SPAD pixel selection process, while fine TDCs are used for the selected SPAD pixel in distance determination. In certain implementations, TDCs may operate at different resolutions: low resolution (low number of time bins per time interval unit) during the SPAD pixel selection process, and high solution (high number of time bins per time interval unit) during distance determination using the selected SPAD pixels. Lidar system 100 reduces the amount of power consumption and calculation complexity by selectively activating (and deactivating or turning off) SPAD pixels based on the target object's image location on the SPAD sensor 140. Control module 130, which may include one or more processor and stored instructions, is configured to select rows (or columns) of SPAD pixels on the SPAD sensor 140 that are actually capturing information related to the target object (e.g., rows 6-9 in FIG. 2) using initial histograms. During the selection process, various processes may be performed by DSP 160 (and/or control module 130 itself) to determine an initial target object location. Control module 130 activates the selected SPAD pixel rows (or columns) while deactivating (or other cause to be in a low-power state) the non-selected SPAD pixel rows (or columns). In various implementations, control module 130 may further update the SPAD pixel row selection in situations as such target object movement, scene chance, and others.

The DSP 160 processes the information stored at memory 170. For example, DSP 160 may perform various processes such as noise removal, ToF calculation, distance calculation, image reconstruction, and/or other functions. Depending on the implementation, functions performed at block 160 may be performed by other modules and/or the microprocessor.

Figure 4:
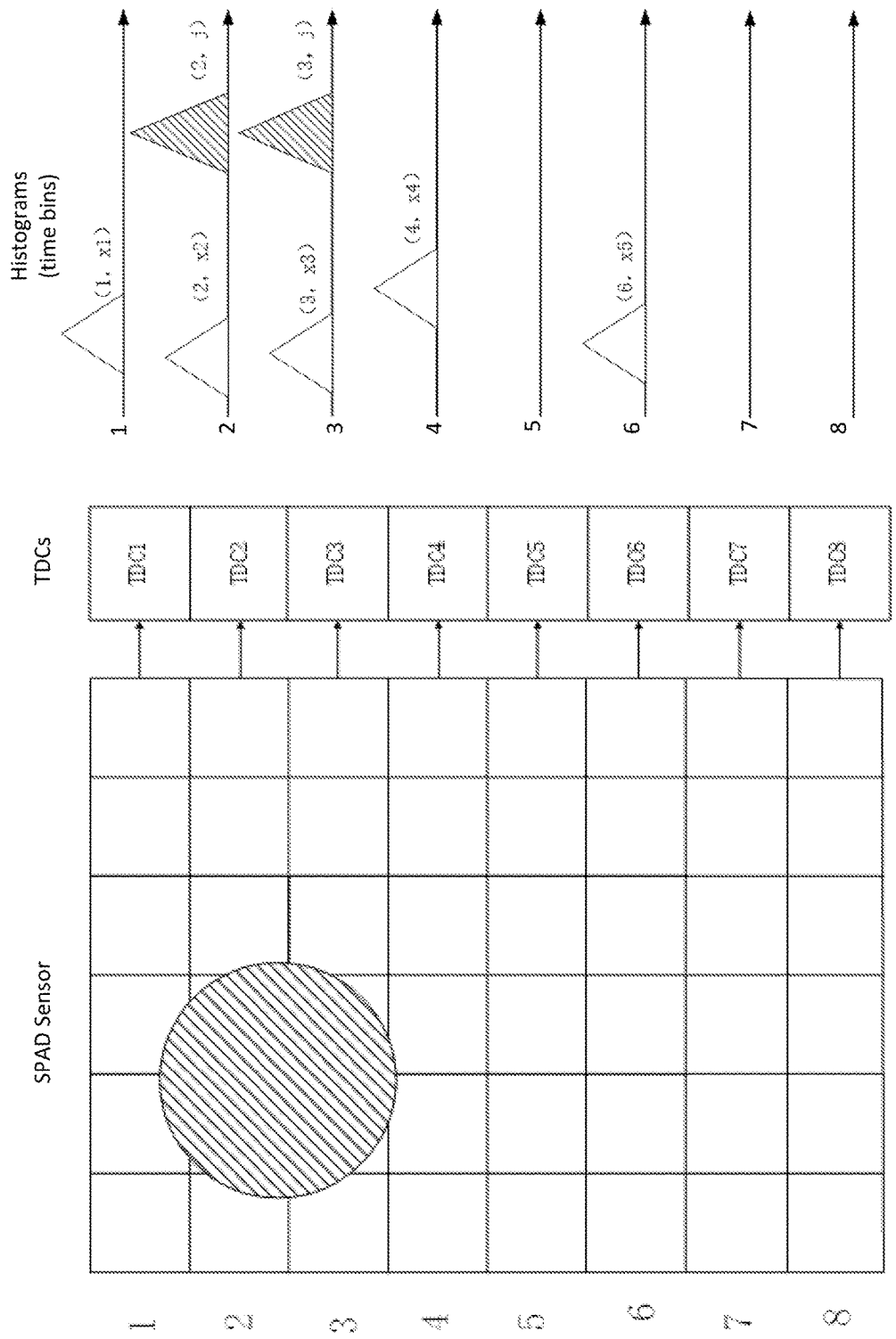
FIG. 4 is a simplified diagram illustrating SPAD pixel selection using aggregate histograms according to embodiments of the present invention.

FIG. 4 is a simplified diagram illustrating SPAD pixel selection using aggregate histograms according to embodiments of the present invention. This diagram is merely an example, which should not unduly limit the scope of the claims. One of ordinary skill in the art would recognize many variations, alternatives, and modifications. TDC1-8 each reads out the output of an entire corresponding SPAD pixel row (i.e., rows 108 as shown). Image of a target object as shown is mainly positioned in rows 2 and 3, which translates to peaks (2, j) and (3, j) in histograms 2 and 3; here "2 and 3" correspond to SPAD rows numbers, and "j" corresponds to a time bin location. The other peaks—such as (1, x1), (2, x2), (3, x3), (4, x4), and (6, x5)—are eliminated as non-useful information (e.g., noise, glare, speckle, etc.) that is eliminated using various processes. For example, the process of identifying useful peaks may be performed by various DSP algorithms and/or machine learning processes. For example, using the histogram as shown, rows 2 and 3 may be selected and activated, while the reaming rows 1 and 4-8 may be deactivated to save power. In certain embodiments, rows 1 and 4 may be selected with rows 2 and 3 for activation, thereby allowing for target object movement and/or other scenarios.

Figure 5A:
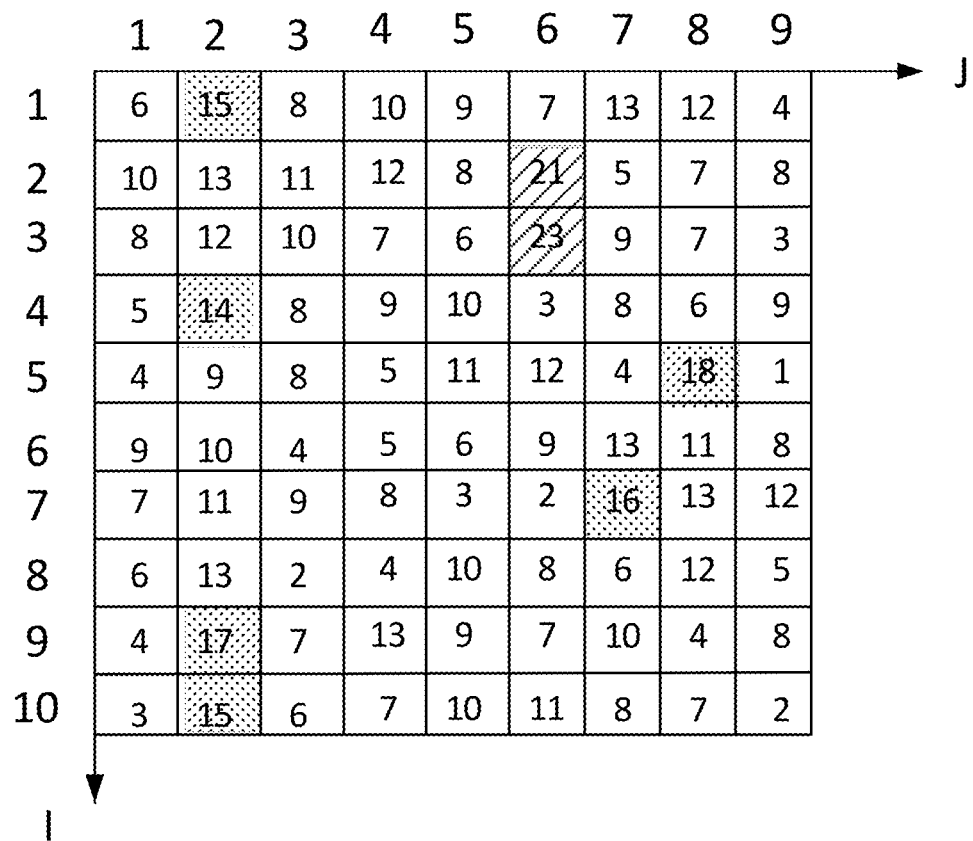
FIGS. 5A and 5B are simplified diagrams illustrating a data structure used for SPAD pixel selection according to embodiments of the present invention.
Figure 5B:
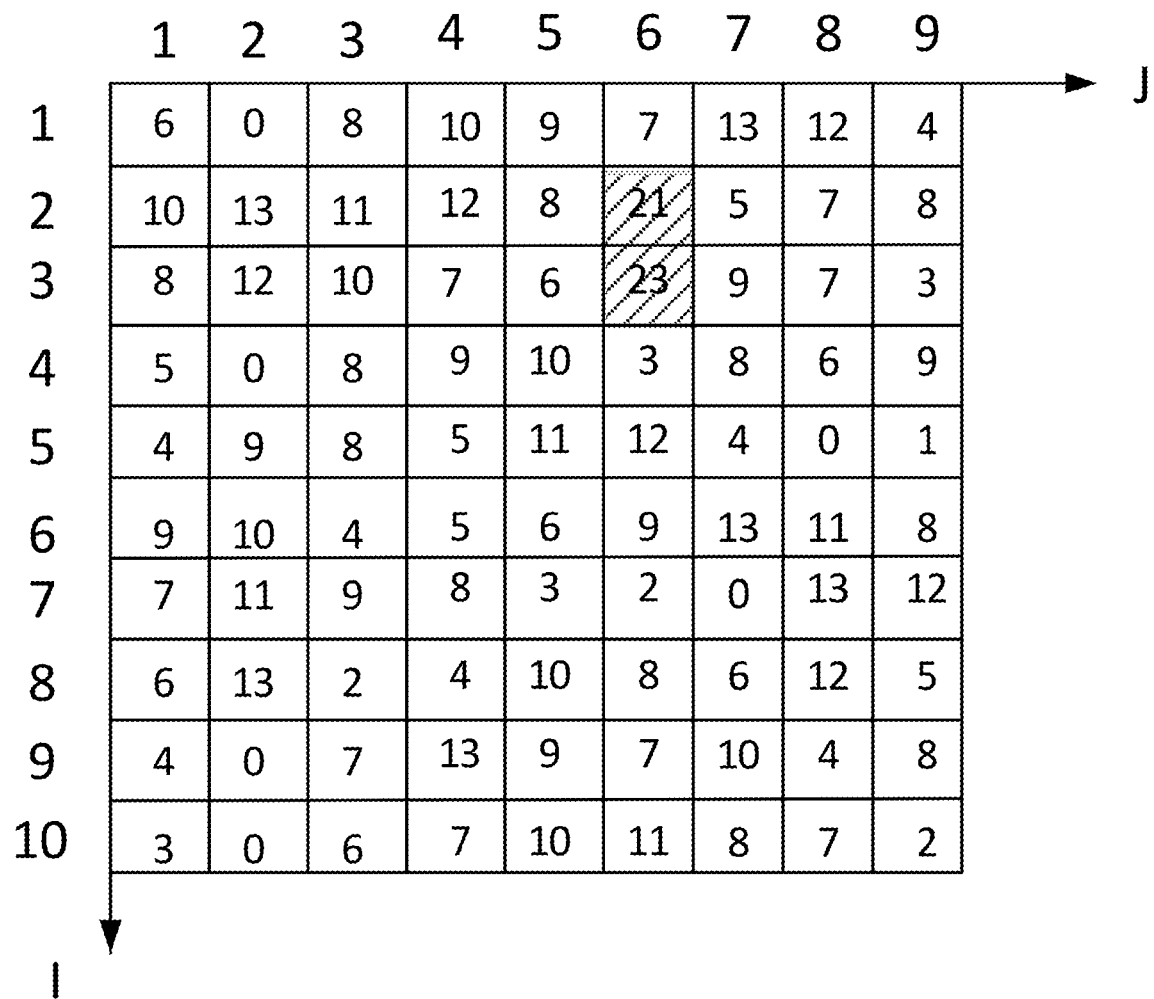

FIGS. 5A and 5B are simplified diagrams illustrating a data structure used for SPAD pixel selection according to embodiments of the present invention. This diagram is merely an example, which should not unduly limit the scope of the claims. One of ordinary skill in the art would recognize many variations, alternatives, and modifications. In FIGS. 5A and 5B, the vertical "I" axis represents SPAD pixel row numbers, while the horizontal "J" axis represents time bin number, and the value in each of the grids is a histogram value (e.g., photon count). For example, the image of a target object is detected in SPAD rows 2 and 3, at time bin 6, with respective values of "21" and "23" as shown; the high values at (2, 6) and (3, 6) and their relative position means that the target object is like to at a position associated with SPAD pixel rows 2 and 3, and the target object distance is at a location correspond to time bin 6 (which can be determined using ToF calculation involving time bin 6). There are other histogram peaks (e.g., as shown in FIG. 5A) such as peak values at (1, 2), (4, 2), (9, 2), (15, 2), (7, 7), and (5, 8), as shown, and these peaks are eliminated using various techniques such as filtering, signal to noise ratio (SNR) calculation, noise reduction, glare removal, and/or others. The resulting data structure is shown in FIG. 5B, where locations (2, 6) and (3, 6) and identified, while other peak values are eliminated (or changed to "0") as shown. It is to be noted that time bin "6" may be identified as a time window of interests, and subsequent processing may allocate computational resources (e.g., time bins around region "6" are further subdivided into smaller time bins provide a higher level of resolution) to process histogram data within a vicinity of the time window of interests. For example, the temporal selection is provided in addition to spatial SPAD pixel (row or column) selection.

It is to be understood that the data structure as shown in FIGS. 5A and 5B can be implemented in various ways, which may be a two-dimensional array with I and J axes as shown. In some embodiments, each row in FIG. 5A is stored as a memory block shown in FIG. 3. There are other implementations as well. In various embodiments, the data structure in FIGS. 5A and 5B is optimized for fast data processing and/or low power consumption.

Figure 6:
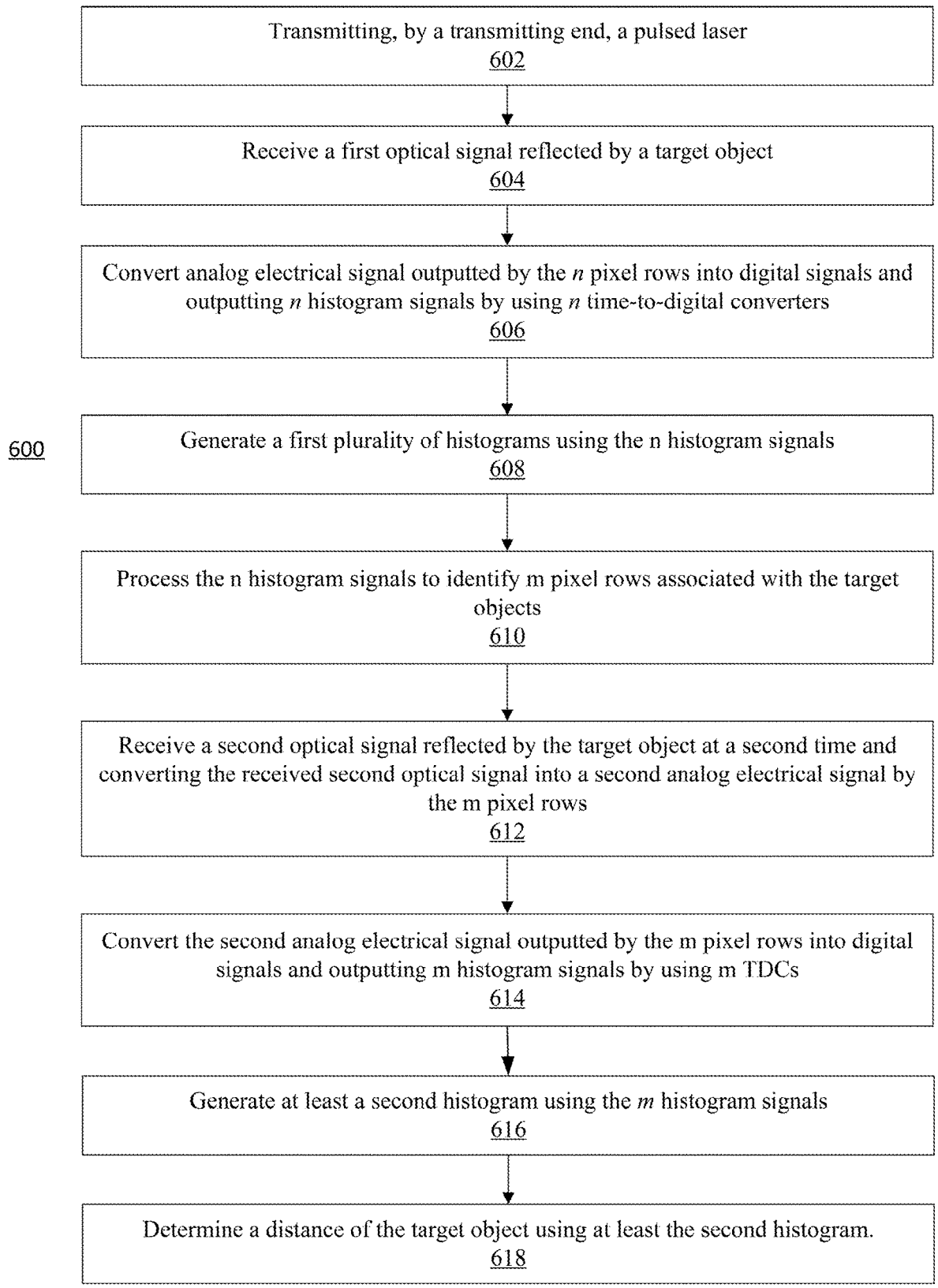
FIG. 6 is a simplified diagram illustrating a method for range determination using selected sensor circuits.

FIG. 6 is a simplified diagram illustrating a method for range determination using selected sensor circuits. This diagram is merely an example, which should not unduly limit the scope of the claims. One of ordinary skill in the art would recognize many variations, alternatives, and modifications. For example, one or more steps may be added, removed, repeated, replaced, rearranged, modified, and should not limit the scope of the claims.

At step 602, a pulsed laser is transmitted from the transmitting end of a lidar system. For example, the pulsed laser may be generated by laser 110 and transmitted via lens 120 as shown in FIG. 1.

At step 604, the optical signal reflected by a target object is received and converted to electrical signals. For example, the reflected optical signal is received by SPAD sensor 140 in FIG. 1, one or more SPAD pixel rows (or columns) contains images of a target object. In various embodiments, the electrical signals from the SPAD sensor correspond to SPAX pixel rows (or columns), not individual SPAD pixel units. For example, n electrical signals are generated based on n SPAD pixel rows.

At step 606, the n analog electrical signal outputted by the n pixel rows are converted into digital signals the n corresponding TDCs, and which output n histogram signals. Each of the n histogram signals corresponds to a SPAD pixel row. For example, n SPAD pixel rows may be coupled to n TDC units as illustrated in FIG. 3, but it is understood that other configurations are possible as well.

At step 608, n histograms are generated using the n histogram signals. For example, as illustrated in FIG. 4, eight histograms are generated for eight SPAD pixel rows. In various embodiments, TDC conversion and histogram generation at steps 606 and 608 are performed for SPAD pixel row selection, and coarse—typically fast and energy efficient—processes are performed.

At step 610, the n histograms are processed to identify m pixel rows associated with the target objects. Depending on the implementation, various signal and image processing techniques may be used to identify the m SPAD pixel rows. For example, in FIG. 4, eight histograms are processed to identify and select SPAD pixel rows 2 and 3. In various embodiments, histograms are stored in the format of the data structure illustrated in FIGS. 5A and 5B. It is to be understood that when there are multiple target objects at different distances, multiple sets of SPAD pixel rows may be selected.

At step 612, a second optical signal reflected by the target object is received and converted to analog electrical signals by the selected m SPAD pixel rows. Assume that the target object's position relative to the lidar has not changed, the selected m SPAD pixel rows are sufficient to determine target object distance, as the remaining SPAD pixel rows are not needed. In various embodiments, the unselected SPAD pixel rows are inactive or turned off to conserve power and computational resources.

At step 614, analog electrical signals provided by the selected m SPAD pixel rows are converted to digital signals by using m TDCs, resulting in m histogram signals. In various embodiments, unselected TDCs are not used, thereby saving power. It is to be appreciated that in addition to power saving, turning off unselected SPAD pixels also reduces the amount of interference among SPAD pixels.

At step 616, at least a second histogram is generated using the m histogram signals generated by the m selected TDCs. In various embodiments, outputs of more than one of the m histogram signals are binned together to generate the second histogram, which is characterized by a higher signal-to-noise ratio (SNR) compared to a histogram that is based on a single SPAD row. In some embodiments, m histograms are generated, each corresponding to a SPAD pixel row.

At step 618, the target object distance is determined using the m of histogram signals. Among other processes, TOF calculations are performed. Additional calculations, such as noise reduction, and other calculations may be performed as well. In certain implementations, a "coarse" calculation is performed using the first plurality of histograms using the data obtained at step 608 (e.g., obtain a distance of 3 meters), and a "fine" (or more precise) calculation is performed at step 618 (e.g., obtaining a more precise distance of 3.25 meters); energy saving is achieved by performing fine calculation only for the output of the selected m SPAD rows, and only around for the time bin locations corresponding to the distance determined at step 618 (e.g., only time bins corresponding to 2-4 meters are calculated at a high resolution). For example, SPAD pixel row selection and distance calculation operate at different resolutions.

Steps 612-618 are performed for actually determining the target object distance—not the "coarse" process that was performed earlier for SPAD pixel row selection—and "fine" distance determination processes and/or hardware are involved. Selected m SPAD pixel rows are converted by TDCs that are capable of (or running at) high resolution (e.g., more time bins per time interval unit) and sensitivity (e.g., 10× more sensitive compared to coarse processes). Additionally, since an approximate distance of the target object is determined during the coarse process, fine measurements and processes may be used around the target time bin (e.g., time bin 6 in FIG. 5A).

As explained above, the move of the image of the target object(s) may necessitate a new SPAD pixel row selection process. Depending on the implementation, the new SPAD pixel row selection process may be triggered in various ways. A lidar system may track one or more target objects in real-time and triggers a SPAD pixel row selection process when target objects move or disappear. In some implementations, the SPAD pixel row selection process is performed periodically. Depending on the implementation, data from the SPAD pixels may be binned in various ways to improve the SNR and data accuracy.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A method for range determination using selected sensor circuits, the method comprising:
transmitting, by a transmitting end, a pulsed laser;
receiving a first optical signal reflected by a target object at a first time and converting the received first optical signal into a first analog electrical signal by a receiving end, wherein the receiving end comprises a plurality of pixel units, the plurality of pixel units including n pixel rows;
converting the first analog electrical signal outputted by the n pixel rows into digital signals and outputting n histogram signals by using n time-to-digital converters (TDCs);
generating a first plurality of histograms using the n histogram signals;
processing the first plurality of histograms to identify m pixel rows associated with the target objects;
receiving a second optical signal reflected by the target object at a second time and converting the received second optical signal into a second analog electrical signal by the m pixel rows;
converting the second analog electrical signal outputted by the m pixel rows into digital signals and outputting m histogram signals by using m TDCs;
generating a at least a second histogram using the m histogram signals; and
determining a first distance of the target object using at least the second histogram.

2. The method of claim 1 further comprising identifying a new set of m pixel rows in response to a location change of the target object.

3. The method of claim 1 wherein the first analog electrical signal is converted by coarse TDCs and the second analog electrical signal is converted by fine TDCs.

4. The method of claim 1 wherein the first plurality of the histograms is characterized by a lower resolution than the second histogram.

5. The method of claim 1 wherein each of n pixel rows includes l pixel units, each of the n TDCs being configured to accumulate a photon count of the l pixel units.

6. The method of claim 1 further comprising:
identifying a plurality of histogram peaks from the n histogram signals;
selecting one or more peaks associated with the target object, the m pixel rows being including pixel units associated with a position of the target object.

7. The method of claim 6 further comprising removing one or more peaks associated with flare or noise.

8. The method of claim 6 further comprising:
identifying one or more time bins associated with one or more peaks;
performing fine calculation using the one or more time bins.

9. The method of claim 1 further comprising turning off n-m pixel rows not associated with a target object.

10. The method of claim 1 further comprising determining a second distance of the target object using the first plurality of histograms.

11. The method of claim 10 wherein the first distance is characterized by a higher level of precision than the second distance.

12. The method of claim 1 further comprising binning the m histogram signals.

13. A lidar system comprising:
a laser source configured to generate a laser signal at a first time within a time interval;
an optical module configured for receiving a reflected laser signal at a second time;
a SPAD sensor comprising n SPAD pixel rows, each of the n SPAD pixel rows comprising l SPAD pixel units;
a first time-to-digital converter (TDC) module comprising n TDC units coupled to the n SPAD pixel rows, the n TDC units being configured to generate n histogram signals, each of the histogram signals being calculated using l SPAD pixel units;
a histogram module configured to generate n histograms using the n histogram signals;
a memory configured to store the n histograms;
a control module configured to select a first plurality of m SPAD pixel rows based at least on the n histograms; and
a processor module configured to calculate a time of flight (TOF) value using at least the outputs of the first plurality of m SPAD pixel rows.

14. The system of claim 13 wherein the laser source and the optical module are associated with a parallax orientation, an orientation of n SPAD pixel rows being selected based at least on the parallax orientation.

15. The system of claim 13 further comprising a second TDC module, the first TDC module being a coarse TDC module characterized by a first sensitivity of less than 0.5 ns, the second TDC module being a fine TDC module characterized by a second sensitivity of great than 0.1 ns.

16. The system of claim 13 further wherein the processor is further configured to calculate a distance using at least the TOF value.

17. The system of claim 13 further comprising a third TDC module comprising n*l TDC units.

18. The system of claim 13 wherein the control module is configured to select a second plurality of m SPAD pixel rows in response to change of a target object location.

19. The system of claim 13 wherein the control module is configured to turn off a second plurality of n-m SPAD pixel rows.

20. The system of claim 13 wherein the processor is further configured to binning two or more outputs of the first plurality of m SPAD pixel rows.

* * * * *